(12) United States Patent
Sankaranarayanan

(10) Patent No.: US 8,935,321 B1
(45) Date of Patent: Jan. 13, 2015

(54) VIRTUALIZED ENVIRONMENT FOR MANAGING HETEROGENOUS ENTERPRISE SOFTWARE APPLICATIONS

(75) Inventor: Hari Bhaskar Sankaranarayanan, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/537,496

(22) Filed: Jun. 29, 2012

(51) Int. Cl.
    *G06F 15/16* (2006.01)
(52) U.S. Cl.
    USPC ............... 709/203; 709/217; 707/802
(58) Field of Classification Search
    CPC ..... H04N 5/66; H04N 5/7441; H04N 9/3111; H04N 9/3126; H04N 9/3167; H04N 9/3197; G06F 11/0793
    USPC .................. 709/203, 217; 707/802
    See application file for complete search history.

(56) References Cited

U.S. PATENT DOCUMENTS

| | | | |
|---|---|---|---|
| 7,603,466 B2* | 10/2009 | Kilian-Kehr et al. | 709/227 |
| 8,359,016 B2* | 1/2013 | Lindeman et al. | 455/414.1 |
| 8,370,428 B1* | 2/2013 | Bayliss et al. | 709/203 |
| 2005/0149484 A1* | 7/2005 | Fox et al. | 707/1 |
| 2008/0155525 A1* | 6/2008 | Ho | 717/168 |
| 2009/0181662 A1* | 7/2009 | Fleischman et al. | 455/419 |
| 2010/0317420 A1* | 12/2010 | Hoffberg | 463/1 |
| 2011/0239134 A1* | 9/2011 | Spataro et al. | 715/753 |
| 2012/0005746 A1* | 1/2012 | Wei et al. | 726/15 |
| 2012/0036552 A1* | 2/2012 | Dare et al. | 726/1 |
| 2012/0129503 A1* | 5/2012 | Lindeman et al. | 455/414.1 |
| 2012/0131685 A1* | 5/2012 | Broch et al. | 726/30 |
| 2012/0210134 A1* | 8/2012 | Mitter | 713/171 |
| 2012/0239704 A1* | 9/2012 | O'Farrell et al. | 707/802 |

* cited by examiner

*Primary Examiner* — Tesfay Yohannes
(74) *Attorney, Agent, or Firm* — Ryan, Mason & Lewis, LLP

(57) ABSTRACT

Methods and apparatus are provided for managing heterogeneous enterprise software applications (apps). A plurality of enterprise applications are provided to users of an enterprise by providing an enterprise application store having a plurality of enterprise applications that are available for download to mobile devices of the users; downloading one or more of the enterprise applications to a mobile device of at least one of the users; and providing a common interface for a plurality of the enterprise applications to a plurality of back-end servers of the enterprise. The enterprise application store may comprise a plurality of layers.

18 Claims, 4 Drawing Sheets

VIRTUALIZED ENVIRONMENT FOR MANAGING HETEROGENOUS ENTERPRISE SOFTWARE APPLICATIONS

FIELD

The present invention relates generally to the field of enterprise applications (apps), and more particularly to a development platform for such enterprise apps.

BACKGROUND

As software applications (apps) for mobile devices, such as smart phones, become increasingly popular for both personal and professional use, the popularity of "app stores" has likewise increased. Consumer apps for personal use, for example, can be easily obtained from app stores provided by, for example, Apple Computer (Apple App Store) for iPhones and Google (Google Play Store) for Android phones. The app stores are digital application distribution platforms that allow users to browse and download applications primarily for personal use. The applications can typically be downloaded directly to a target mobile device, or downloaded onto a personal computer.

Companies are unable to use such consumer app stores to distribute in-house apps, often referred to as enterprise apps, to their employees. Thus, enterprise app stores have begun to emerge. An enterprise app store can be implemented, for example, on an internal enterprise website where all of the apps that have been developed for employee use can be listed. The enterprise apps can then be downloaded by authorized employees to their mobile devices. Such enterprise app stores typically include a licensing component, a catalog of available apps, access controls and software usage reporting mechanisms.

Enterprise apps provide a mechanism for employees of the enterprise (and other authorized users) to easily access and interact with company information directly from their mobile devices. Enterprise apps typically provide employees with access to a wide range of Business Intelligence (BI) systems and enterprise data sources. Each enterprise app, however, is typically developed for a dedicated purpose and provides functionality and data access completely independent of other enterprise apps. Two enterprise apps that provide access to the same dataset are typically developed independently. Thus, there is often duplication in the development effort, as well as in the ongoing data processing. For example, a human resources app might determine the eligibility of an employee to purchase a new laptop, while an independent finance app might process the expenses associated with the purchase to generate an expense report.

A need therefore exists for an enterprise app development platform that provides a common framework to leverage and promote re-use of existing functionality. A further need exists for an enterprise app development platform that provides a common interface to enterprise data and services so that a plurality of enterprise apps can more efficiently access the same enterprise data and services.

SUMMARY

Generally, methods and apparatus are provided for managing heterogeneous enterprise software applications (apps). According to one aspect of the invention, a plurality of enterprise applications are provided to users of an enterprise by providing an enterprise application store having a plurality of enterprise applications that are available for download to mobile devices of the users; downloading one or more of the enterprise applications to a mobile device of at least one of the users; and providing a common interface for a plurality of the enterprise applications to a plurality of back-end servers of the enterprise.

According to a further aspect of the invention, the enterprise application store comprises a plurality of layers. For example, a mobile store access layer provides one or more of a look up for mobile data objects and a directory of available objects to build the enterprise applications. The mobile data objects and/or the available objects are available for use by a plurality of the enterprise applications.

A common data access layer is also optionally provided, where mobile data objects are found. The common data access layer comprises a plurality of pre-defined data objects governed by a data integration data schema. The mobile data objects are available for use by a plurality of the enterprise applications. In addition, an optional services layer manages transactions from a front-end of the enterprise applications.

The enterprise app development platform of the illustrative embodiments overcome one or more of the problems associated with the conventional techniques described previously, and permit enterprises to provide enterprise apps to users in a manner that leverages existing functionality and provides a common interface to enterprise data and services. These and other features and advantages of the present invention will become more readily apparent from the accompanying drawings and the following detailed description.

DETAILED DESCRIPTION

The present invention provides a virtualized environment for managing heterogeneous enterprise software applications (apps). According to one aspect of the invention, the disclosed enterprise app development platform leverages existing functionality when developing a new enterprise app to re-use existing functionality. According to another aspect of the invention, the disclosed enterprise app development platform provides a common interface to enterprise data and services so that a plurality of enterprise apps can more efficiently access the same enterprise data and services.

Figure 1:
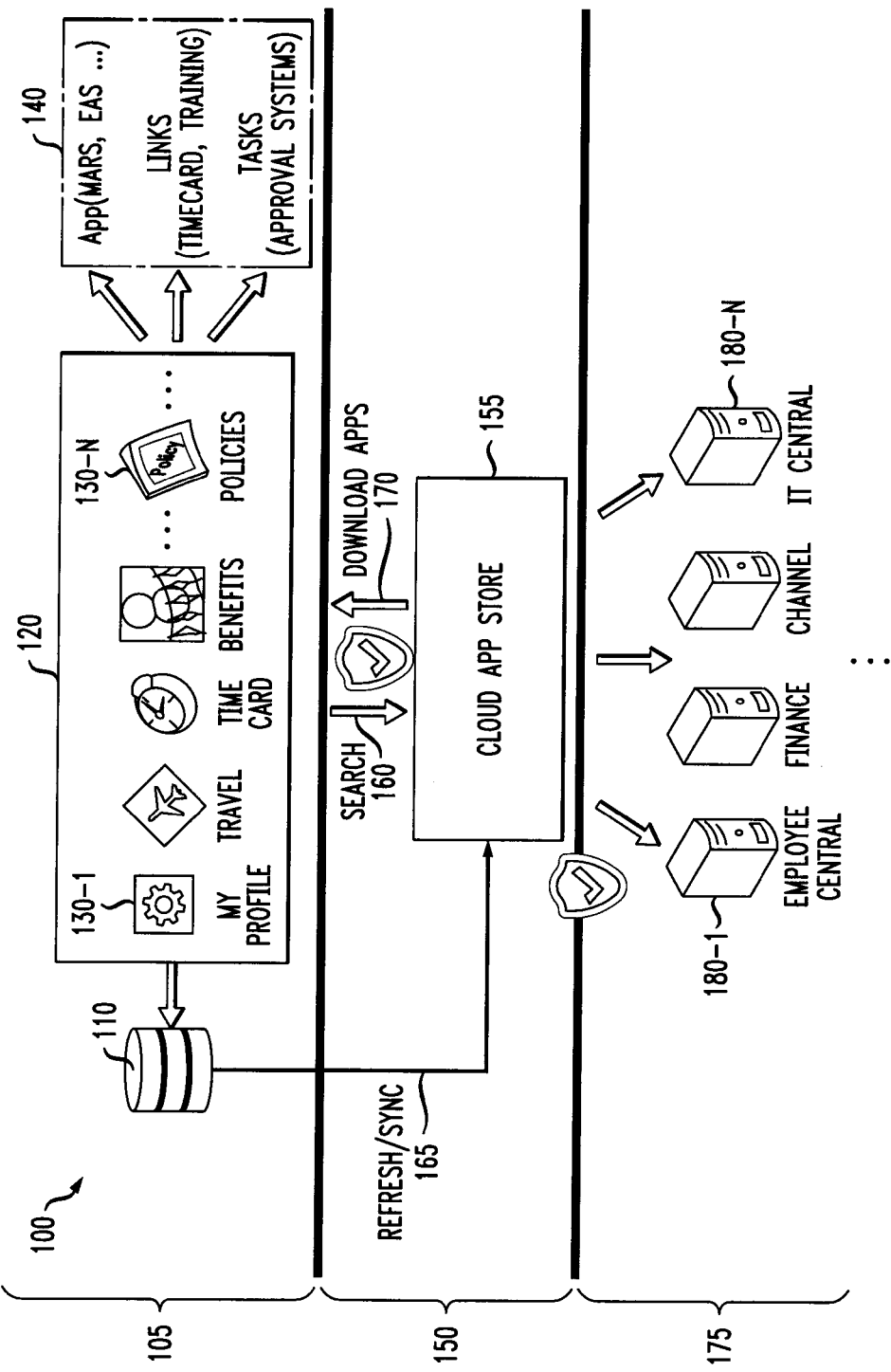
FIG. 1 illustrates an exemplary architecture for an enterprise app store platform that incorporates aspects of the present invention.

FIG. 1 illustrates an exemplary architecture for an enterprise app store platform 100 that incorporates aspects of the present invention. As shown in FIG. 1, the exemplary enterprise app store platform 100 comprises a client layer 105, a cloud layer 150 and a backend server layer 175. The client layer 105 comprises client device(s) 120, such as desktop computers, mobile devices and tablets. One or more client device(s) 120 include a plurality of exemplary enterprise apps 130-1 through 130-N. Generally, the enterprise apps 130 provide access to various enterprise resources 140, such as additional apps, links and tasks. In addition, the exemplary client layer 105 includes a client database 110 for storing user preferences and caching data. The cached data reduces latency by providing data without going to the servers 180 for each request.

The cloud layer 150 comprises an enterprise app store 155. Users can employ a search function 160 to locate apps 130 of interest, and thereafter use a download function 170 to download apps. A refresh and synchronization function 165 interacts between the enterprise app store 155 and the client database 110 to maintain offline interaction and perform periodic refreshes. The cloud layer 150 provides an interface for communicating with backend resources, such as servers in the backend server layer 175. The backend server layer 175 comprises a plurality of servers 180-1 through 180-N that record enterprise data and services.

Figure 2:
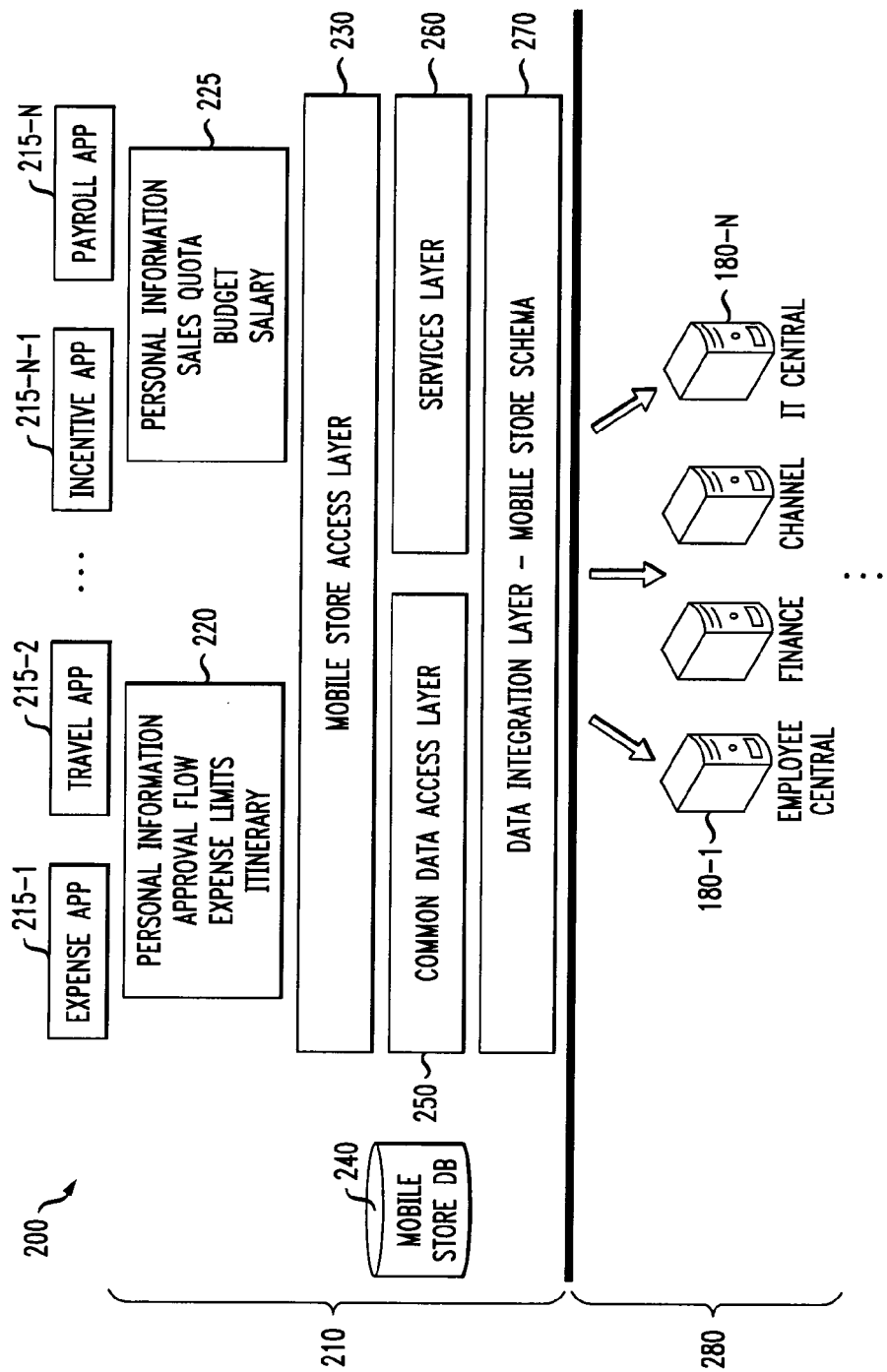
FIG. 2 illustrates an exemplary architecture for the enterprise app store of FIG. 1 in further detail.

FIG. 2 illustrates an exemplary architecture 200 for the enterprise app store 155 of FIG. 1 in further detail. As shown in FIG. 2, the exemplary architecture 200 comprises an app layer 210 and a backend layer 280. The exemplary app layer 210 comprises a plurality of exemplary apps 215-1 through 215-N, such as an expense app 215-1 and a travel app 215-2, which are common in an enterprise environment. A number of apps 215 access common information. For example, the expense app 215-1 and the travel app 215-2 access common data 220, such as personal information, approval flows, expense limits and itinerary records. Similarly, an exemplary incentive app 215-N–1 and an exemplary payroll app 215-N access common data 225, such as personal information, sales quotas, budget and salary records.

In addition, the exemplary app layer 210 comprises a mobile store access layer 230, common data access layer 250 and a services layer 260. Generally, the mobile store access layer 230 provides a look up for mobile data objects or a directory of available objects to build the mobile apps in a similar manner to a data dictionary. The exemplary common data access layer 250 is an important layer where mobile data objects are found. The exemplary common data access layer 250 can have a set of pre-defined data objects that are governed by a data integration data schema 270, as discussed further below in conjunction with FIG. 3, that are abstracted for common mobile application needs. The mobile apps 215 can use the data objects and services directly for reading and updating them. The common data store database 110 of FIG. 1 is the mobile data store 240 on the cloud layer to share data between applications 215.

The exemplary services layer 260 manages the transactions from the front-end of the mobile apps 215. The mobile data objects are decomposed into individual transaction based components for the backend servers 180. The services layer 260 can also provide additional utility services that can be leveraged by the mobile apps 215.

Figure 3:
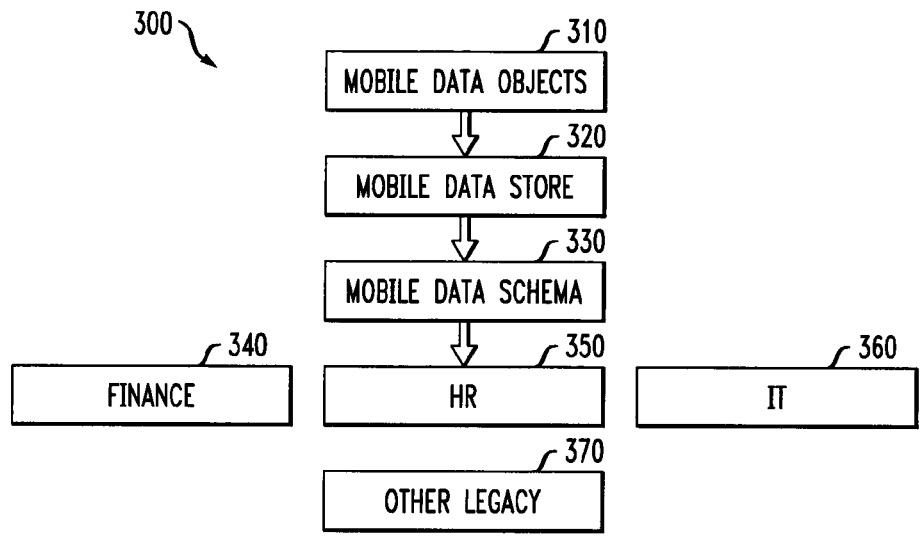
FIG. 3 is a flow chart describing an exemplary implementation of a read flow process that incorporates aspects of the present invention.

FIG. 3 is a flow chart describing an exemplary implementation of a read flow process 300 that incorporates aspects of the present invention. As shown in FIG. 3, mobile apps 215 access mobile data objects during step 310 directly for their use (especially read requests). In addition, a mobile data store 320 is a collection of "real" world information based on the requirements of a given mobile app 215. A mobile data schema 330 defines the governing collection of data objects. The data integration layer 270 converts the back-end data into the mobile store schema of the data integration layer 270.

The data is managed and governed by individual systems, such as a finance system 340, a human resources (HR) system 350 and an information technology (IT) system 360, as well as other legacy systems 370.

Figure 4:
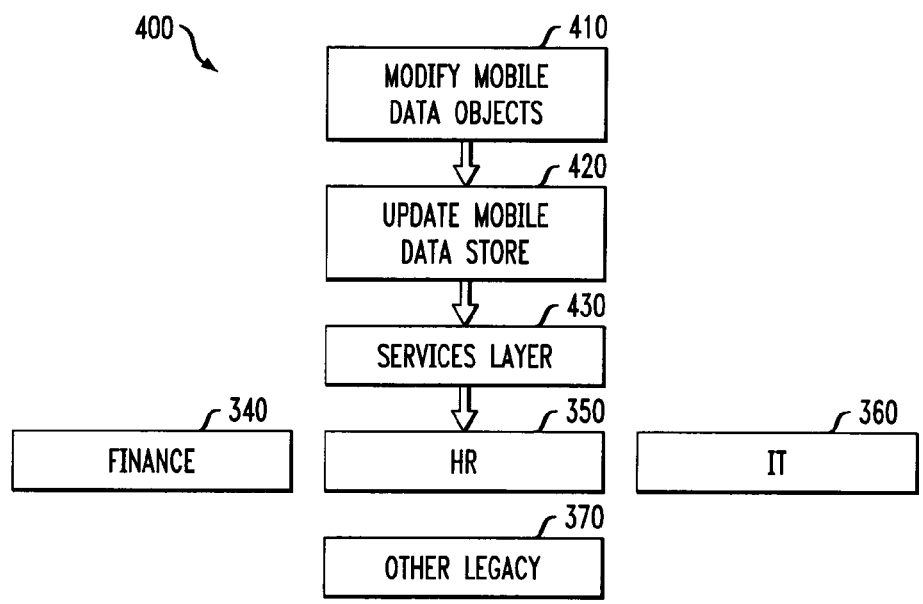
FIG. 4 is a flow chart describing an exemplary implementation of an update flow process that incorporates aspects of the present invention.

FIG. 4 is a flow chart describing an exemplary implementation of an update flow process 400 that incorporates aspects of the present invention. As shown in FIG. 4, the mobile apps 215 modify mobile data objects to update the data during step 410. The mobile data store is updated/refreshed during step 420. The services layer 260 talks to the back-end servers 180 to update relevant systems during step 430 in the individual systems, such as a finance system 340, a human resources (HR) system 350 and an information technology (IT) system 360, as well as other legacy systems 370.

Enterprise App Distribution System

Figure 5:
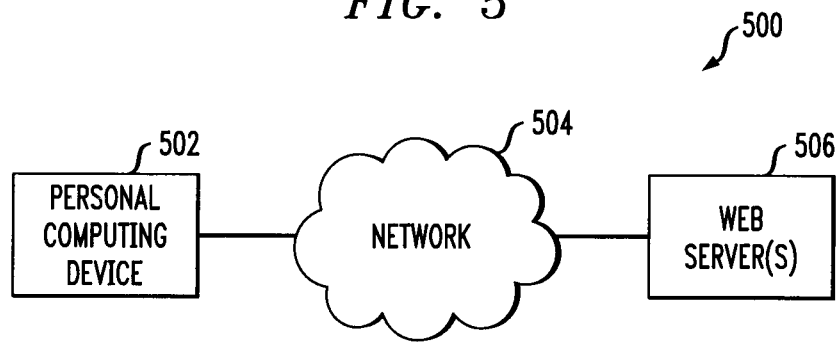
FIG. 5 illustrates an exemplary enterprise app distribution system in accordance with the present invention.

FIG. 5 illustrates an exemplary enterprise app distribution system 500 in accordance with the present invention. As shown in FIG. 5, the exemplary enterprise app distribution system 500 comprises a personal computing device 502, a network 504, and one or more data and/or web servers 506. The personal computing device 502 may be, for example, a mobile telephone, tablet, a desktop, laptop or palmtop PC, a personal digital assistant (PDA), a wireless email device, a workstation, a kiosk, a television set-top box, a game console, or any other information processing device configured to enterprise apps as described herein. A given server 506 may be implemented as a computer or other stand-alone processing platform, or may be distributed over multiple processing platforms comprising multiple separate computers. Numerous other arrangements of one or more servers are possible in the enterprise app distribution system 500. The personal computing device 502 and the server(s) 506 are examples of what are more generally referred to herein as "processing devices."

The personal computing device 502 will generally include a user interface through which an associated user can interact with the system. This interaction optionally allows the user to authenticate to the system so as to obtain access to a protected resource without requiring the user to present a predetermined credential such as an established PIN or a password from a particular authentication token. Any of a wide variety of conventional primary authentication processes may optionally be implemented using the system 500. These primary authentication processes may be utilized when the user is in possession of his or her appropriate predetermined credential(s). Such primary authentication processes are well known to those skilled in the art.

The protected resource may be designated functionality of the personal computing device itself. In such an arrangement, the user is able to access the interface in order to attempt to authenticate but is not granted access to any other functionality of the personal computing device until such time as the user is authenticated. An important advantage of an arrangement of this type is that the personal computing device need not have network connectivity at the time of the access request.

Alternatively, the protected resource may be a resource of the server(s) 506 or a resource accessible via the server(s) 506. In such an arrangement, the user interface of the personal computing device 502 may still be used to obtain user input as part of a process in which the user authenticates to the server(s).

The network 504 may comprise, for example, the Internet, a wide area network (WAN), a local area network (LAN), a satellite network, a telephone or cable network, or various portions or combinations of these and other types of networks.

It is to be appreciated that a given embodiment of the system 500 may include multiple instances of personal computing device 502, network 504 and server set 506, although only single instances of such components are shown in the simplified system diagram for clarity of illustration. For example, a given user may have multiple personal computing devices that access different sets of servers over different networks.

Figure 6:
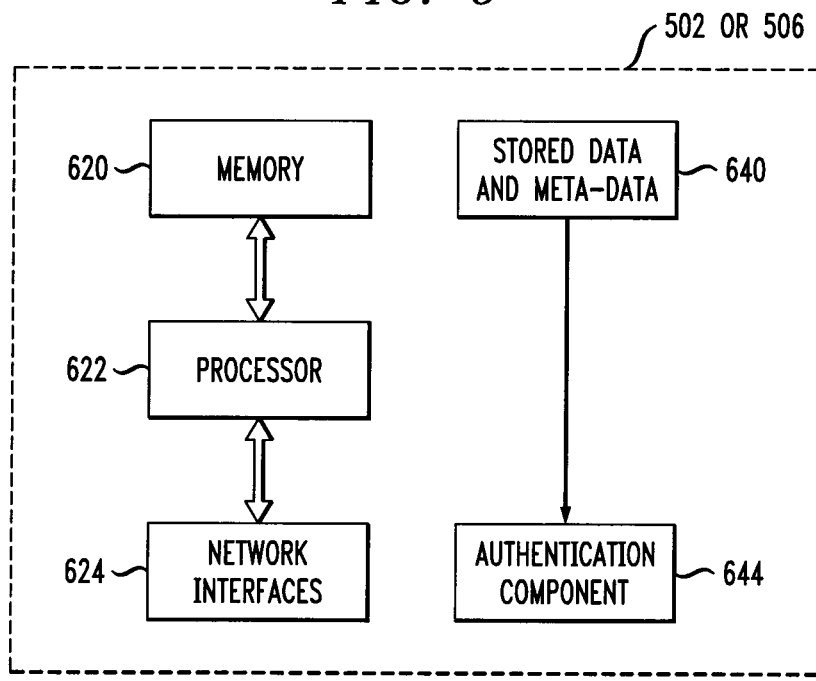
FIG. 6 shows a more detailed view of one possible implementation of a personal computing device or server of the FIG. 5 system.

Referring now to FIG. 6, a more detailed illustrative implementation of a processing device of the system 500 is shown. The processing device shown may be viewed as representing personal computing device 502 or a given server 506. The processing device 502 or 506 comprises a memory 620 coupled to a processor 622. The processor 622 is also coupled to interface circuitry comprising network interfaces 624. A given such network interface is utilized for communicating in a conventional manner with the network 504.

The various elements 620, 622 and 624 of FIG. 6 may be implemented in whole or in part as a conventional microprocessor, microcontroller, digital signal processor, application-specific integrated circuit (ASIC) or other type of circuitry, as well as portions or combinations of such circuitry elements. As will be appreciated by those skilled in the art, portions of a enterprise app distribution process in accordance with an embodiment of the invention can be implemented at least in part in the form of one or more software programs that are stored at least in part in memory 620 and executed by processor 622.

Also included in processing device 502 or 506 as shown in FIG. 6 are a number of additional elements, including stored information 640 and an optional authentication component 644. One or more of these elements may be implemented at least in part in the form of software that is stored in the memory 620 and executed by the processor 622. One skilled in the art would be readily able to implement such software given the teachings provided herein. The memory 620 is an example of what is more generally referred to herein as a "processor-readable storage medium."

The processing device 502 or 506 is optionally configured to support user authentication utilizing elements 640 and 644, in a known manner.

Generally, the stored information 640 may comprise, for example, stored data and meta-data indicative of a manner in which the user had utilized the protected resource during one or more previous authenticated accesses to the protected resource. The meta-data may be used to determine previous access times for files and other information elements of the protected resource. It is important to note that the stored information 640 will typically comprise information that is already present in the processing device, such as stored files and associated meta-data. Such information is stored in the ordinary course of operation of the processing device, and may be used as a basis for user authentication as described herein.

In a given embodiment, the stored information 640 is entirely within the personal computing device 502. As mentioned above, this is a particularly advantageous arrangement in that the personal computing device need not have network connectivity at the time of the access attempt.

The authentication component 644 receives input from the user regarding one or more characteristics of the stored information 640. For example, the authentication component 644 may formulate a number of questions based on the characteristic(s). The authentication component 644 grants or denies access to the protected resource based at least in part on the input received from the user.

Conclusion

As previously indicated, the above-described embodiments of the invention are presented by way of illustrative example only. Numerous variations and other alternative embodiments may be used, as noted above.

The present invention provides a virtualized environment for managing heterogeneous enterprise software applications (apps). The disclosed enterprise app development platform leverages existing functionality when developing a new enterprise app to re-use existing functionality. In addition, the disclosed enterprise app development platform provides a common interface to enterprise data and services so that a plurality of enterprise apps can more efficiently access the same enterprise data and services.

Additional details regarding certain conventional cryptographic techniques may be found in, e.g., A. J. Menezes et al., Handbook of Applied Cryptography, CRC Press, 1997, which is incorporated by reference herein.

The illustrative embodiments of the invention as described herein provide an enterprise app distribution platform. Advantageously, the illustrative embodiments do not require changes to existing communication protocols. It is therefore transparent to both existing applications and communication protocols.

It should again be emphasized that the particular authentication and communication techniques described above are provided by way of illustration, and should not be construed as limiting the present invention to any specific embodiment or group of embodiments. For example, as previously noted, the described embodiments may be adapted in a straightforward manner to operate with other types of credentials or authentication information. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for providing a plurality of enterprise applications to users of an enterprise, comprising:
providing an enterprise application store having said plurality of enterprise applications that are available for download to mobile devices of said users, wherein said enterprise application store comprises (i) a common data access layer comprising a plurality of pre-defined data objects defined by a data integration data schema, wherein said pre-defined data objects can be read and updated by said plurality of enterprise applications; (ii) a services layer to manage transactions from a front-end of the enterprise applications; and (iii) a mobile data store to store data from a plurality of enterprise systems defined by a common mobile data schema, wherein said stored data is shared between said plurality of enterprise applications, wherein said mobile data store caches and periodically refreshes said stored data to provide offline access of said stored data;
downloading one or more of said enterprise applications to a mobile device of at least one of said users; and providing a common interface for said plurality of enterprise applications to a plurality of back-end servers of said enterprise.

2. The method of claim 1, wherein said enterprise application store further comprises a mobile store access layer that provides one or more of a look up for mobile data objects and a directory of available objects to build said enterprise applications.

3. The method of claim 2, wherein one or more of said mobile data objects and said available objects are available for use by said plurality of enterprise applications.

4. The method of claim 1, wherein said common data access layer further comprises mobile data objects.

5. The method of claim 4, wherein said mobile data objects are available for use by said plurality of enterprise applications.

6. An apparatus for providing a plurality of enterprise applications to users of an enterprise, the apparatus comprising:
   a memory; and
   at least one hardware device, coupled to the memory, operative to:
   provide an enterprise application store having said plurality of enterprise applications that are available for download to mobile devices of said users, wherein said enterprise application store comprises (i) a common data access layer comprising a plurality of pre-defined data objects defined by a data integration data schema, wherein said pre-defined data objects can be read and updated by said plurality of enterprise applications; (ii) a services layer to manage transactions from a front-end of the enterprise applications; and (iii) a mobile data store to store data from a plurality of enterprise systems defined by a common mobile data schema, wherein said stored data is shared between said plurality of enterprise applications, wherein said mobile data store caches and periodically refreshes said stored data to provide offline access of said stored data;
   download one or more of said enterprise applications to a mobile device of at least one of said users; and
   provide a common interface for said plurality of enterprise applications to a plurality of back-end servers of said enterprise.

7. The apparatus of claim 6, wherein said enterprise application store further comprises a mobile store access layer that provides one or more of a look up for mobile data objects and a directory of available objects to build said enterprise applications.

8. The apparatus of claim 7, wherein one or more of said mobile data objects and said available objects are available for use by said plurality of enterprise applications.

9. The apparatus of claim 6, wherein said common data access layer further comprises mobile data objects.

10. The apparatus of claim 9, wherein said mobile data objects are available for us by said plurality of enterprise applications.

11. An article of manufacture for providing a plurality of enterprise applications to users of an enterprise, comprising a non-transitory machine readable recordable medium containing one or more programs which when executed implement the steps of:
    providing an enterprise application store having said plurality of enterprise applications that are available for download to mobile devices of said users, wherein said enterprise application store comprises (i) a common data access layer comprising a plurality of pre-defined data objects defined by a data integration data schema, wherein said pre-defined data objects can be read and updated by said plurality of enterprise applications; (ii) a services layer to manage transactions from a front-end of the enterprise applications; and (iii) a mobile data store to store data from a plurality of enterprise systems defined by a common mobile data schema, wherein said stored data is shared between said plurality of enterprise applications, wherein said mobile data store caches and periodically refreshes said stored data to provide offline access of said stored data;
    downloading one or more of said enterprise applications to a mobile device of at least one of said users; and
    providing a common interface for said plurality of enterprise applications to a plurality of back-end servers of said enterprise.

12. The article of manufacture of claim 11, wherein said enterprise application store further comprises a mobile store access layer that provides one or more of a look up for mobile data objects and a directory of available objects to build said enterprise applications.

13. The article of manufacture of claim 12, wherein one or more of said mobile data objects and said available objects are available for us by said plurality of enterprise applications.

14. The article of manufacture of claim 11, wherein said common data access layer further comprises mobile data objects.

15. The article of manufacture of claim 14, wherein said mobile data objects are available for us by said plurality of enterprise applications.

16. The method of claim 1, wherein said mobile data store comprises user preferences.

17. The apparatus of claim 6, wherein said mobile data store comprises user preferences.

18. The article of manufacture of claim 11, wherein said mobile data store comprises user preferences.

* * * * *

UNITED STATES PATENT AND TRADEMARK OFFICE
CERTIFICATE OF CORRECTION

| | |
|---|---|
| PATENT NO. | : 8,935,321 B1 |
| APPLICATION NO. | : 13/537496 |
| DATED | : January 13, 2015 |
| INVENTOR(S) | : Hari Bhaskar Sankaranarayan |

It is certified that error appears in the above-identified patent and that said Letters Patent is hereby corrected as shown below:

In the specification

Column 1, line 18, replace the words "Apple Computer, Apple App Store and iPhones" with --Apple® Computer, Apple® App Store and iPhones®--.

Column 1, line 19, replace the words "Google, Google Play Stores and Android" with --Google®, Google® Play Stores and Android™--.

In the claims

In Column 8, Claim 10, line 4, replace "for us" with --for use--.

In Column 8, Claim 13, line 38, replace "for us" with --for use--.

In Column 8, Claim 15, line 43, replace "for us" with --for use--.

Signed and Sealed this
Twenty-second Day of March, 2016

Michelle K. Lee
*Director of the United States Patent and Trademark Office*